United States Patent [19]

Hosoya

[11] Patent Number: 5,412,943

[45] Date of Patent: May 9, 1995

[54] APPARATUS AND METHOD FOR INTRODUCING SECONDARY AIR FOR CLEANING EXHAUST EMISSIONS FROM INTERNAL COMBUSTION ENGINE

[75] Inventor: Yasuhiko Hosoya, Himeji, Japan

[73] Assignee: Mitsubishi Denki Kabushiki Kaisha, Tokyo, Japan

[21] Appl. No.: 200,466

[22] Filed: Feb. 24, 1994

[30] Foreign Application Priority Data

Feb. 25, 1993 [JP] Japan ................. 5-036581
Jun. 28, 1993 [JP] Japan ................. 5-157157
Aug. 31, 1993 [JP] Japan ................. 5-216213

[51] Int. Cl.⁶ ............................. F01N 3/20
[52] U.S. Cl. ......................... 60/276; 60/277; 60/285; 60/300
[58] Field of Search ............ 60/274, 276, 277, 284, 60/285, 289, 300, 307

[56] References Cited

U.S. PATENT DOCUMENTS

| | | | |
|---|---|---|---|
| 3,918,257 | 11/1975 | Hirose | 60/285 |
| 3,979,185 | 9/1976 | Stevenson | 60/299 |
| 5,136,842 | 8/1992 | Achleitner | 60/274 |
| 5,224,335 | 7/1993 | Yoshizaki | 60/277 |
| 5,337,555 | 8/1994 | Tokuda | 60/276 |

FOREIGN PATENT DOCUMENTS

| | | |
|---|---|---|
| 21018 | 11/1972 | Japan . |
| 60019 | 4/1984 | Japan . |
| 143362 | 6/1988 | Japan . |

OTHER PUBLICATIONS

U.S. Appln. SN 07/978,414 filed Nov. 18, 1992, GAU 3403.
U.S. Appln. SN 08/078,465 filed Jun. 18, 1993, Gau 3402.

Primary Examiner—Ira S. Lazarus
Assistant Examiner—Daniel J. O'Connor
Attorney, Agent, or Firm—Sughrue, Mion, Zinn, Macpeak and Seas

[57] ABSTRACT

A secondary air introduction apparatus introduces secondary air into an exhaust system of an internal combustion engine so as to clean exhaust gases emitted from the engine through the aid of a catalyst which is disposed in the exhaust system. The apparatus has a heating device which heats the secondary air which is to be introduced into the exhaust system, thereby elevating the temperature of the exhaust gases when the noxious components in the exhaust gases react with the oxygen in the secondary air, thereby improving the cleaning efficiency. In one form of the apparatus, the heating device is fixed to a part of the exhaust system such as a catalyst case connected in the exhaust pipe. The apparatus may have a controller which, upon detecting occurrence of any abnormality through detection of the temperature of the secondary air heated by the heating device, operates to activate a warning device or stop the operation of the whole apparatus. Also disclosed is a method of introducing secondary air by using the secondary air introduction apparatus.

7 Claims, 11 Drawing Sheets

APPARATUS AND METHOD FOR INTRODUCING SECONDARY AIR FOR CLEANING EXHAUST EMISSIONS FROM INTERNAL COMBUSTION ENGINE

BACKGROUND OF THE INVENTION

1. Field of the Invention

The present invention relates to an apparatus and a method for introducing secondary air heated in a heater into an exhaust system of an internal combustion engine so as to clean exhaust emission or gases emitted from the internal combustion engine.

2. Description of the Related Art

In general, the exhaust system of an internal combustion engine mounted on a vehicle has a cleaning catalyst such as a ternary catalyst for cleaning the exhaust gases. When the engine is started up from cold state, secondary air is introduced into the exhaust system so as to improve the efficiency of cleaning of the exhaust gases by the catalyst.

The cleaning efficiency of the cleaning catalyst is low when the engine is started up, because the temperature of the exhaust gases, as well as the temperature of the cleaning catalyst, is still low. The present applicant therefore has proposed a secondary air introduction system which heats the secondary air to be introduced into the exhaust system so as to further improve the cleaning efficiency during starting up of the engine.

FIG. 12 is a diagram showing various systems around an internal combustion engine equipped with the above-mentioned secondary air introduction system. An internal combustion engine 1 has an intake system including an intake pipe 2 and an exhaust system including an exhaust pipe 3. The engine further has a throttle valve 5, a catalyst case 6 provided in the exhaust pipe 3 and containing a cleaning catalyst for cleaning the exhaust gases, a transmission 7, and a secondary air introduction apparatus 8 for improving efficiency of cleaning of the exhaust gas by the cleaning catalyst particularly when the engine is being started up. The secondary air introduction apparatus 8 is adapted to supply secondary air to a portion of the exhaust pipe 3 upstream of the catalyst case 6 at a predetermined rate.

The secondary air introduction apparatus 8 will be described in more detail. The secondary air introduction apparatus has a secondary air introduction pipe 10 which is connected at its one end to the exhaust pipe 3, an air pump 11 which supplies secondary air to the other end of the secondary air introduction pipe 10, a control valve disposed in the secondary air introduction pipe 10 and adapted for controlling the rate of supply of the secondary air through the secondary air introduction pipe 10, a check valve 13 disposed in the secondary air introduction pipe 10, a heater 14 which is disposed at a portion of the secondary air introduction pipe 10 near the junction between the pipe 10 and the exhaust pipe 3, and a controller 15 for controlling the operations of the air pump 11, control valve 12 and the heater 14.

Numeral 16 designates a battery for supplying the air pump 11 and the heater 14 with electrical power, while 17 designates an air pump relay for starting and stopping the air pump 11 by connecting and disconnecting the power supply line between the battery 16 and the air pump 11 in accordance with instructions given by the controller 15. Numeral 18 designates a heater relay for starting and stopping the operation of the heater 14 by connecting and disconnecting the power supply line between the battery 16 and the air pump 11 in accordance with instructions given by the controller 15.

A description will now be given of the operation of the secondary air introduction apparatus 8 with specific reference to FIG. 13 which illustrates the manner in which the rate of supply of the secondary air by the air pump 11 varies in relation to time.

The controller 15 operates to turn the heater relay 18 on simultaneously with the start of the internal combustion engine 1. As a result, electrical power is supplied from the battery 16 to the heater 14 thereby activating the heater 14. The controller 15 also turns the air pump relay 17 on simultaneously with or with a certain time lag after the start of the internal combustion engine 1. Consequently, electrical power is supplied from the battery 16 to the air pump 11 to start the air pump 11. The controller 15 also operates to open the control valve 12 to a predetermined degree of opening simultaneously with the start of the internal combustion engine 1. Consequently, secondary air is supplied at a predetermined rate by the air pump 11 into the secondary air introduction pipe 10 via the control valve 12 as shown in FIG. 13. The secondary air reaches the heater 14 via the check valve 13 so as to be heated by the heater 14 up to a predetermined temperature and is then introduced into the exhaust pipe 3.

The heated secondary air thus introduced into the exhaust pipe 3 flows into the catalyst case 6 together with the exhaust gases emitted from the internal combustion engine 1. The cleaning catalyst in the catalyst case 6 promotes reactions between the hydrocarbons (HC) and carbon monoxide (CO) in the exhaust gases and oxygen contained in the secondary air, thus cleaning the exhaust gases. The heated secondary air serves to elevate the temperature of the exhaust gas which is low immediately after the start up of the internal combustion engine 1. Consequently, the temperature of the cleaning catalyst inside the catalyst case 6 is raised correspondingly to enhance the activity, thus improving efficiency of cleaning of the exhaust gases.

The operation of the secondary air introduction apparatus 8 is stopped when the temperature of the exhaust gas is raised to a level high enough to sufficiently activate the cleaning catalyst in the catalyst case 6. More specifically, the controller 15 operates to turn the air pump relay 17 and the heater relay 18 off, thus terminating the operations of the air pump 11 and the heater 14. At the same time, the controller 15 operates to fully close the control valve 12.

The secondary air introduction apparatus 8 of the type described has a drawback in that there is no means for enabling detection of any trouble such as operation failure of the air pump 11, accidental disconnection of the secondary air introduction pipe 10 from the exhaust pipe 3 or sticking of the control valve 12 in the close position. Such a trouble may inconveniently lead to an accident such as shortening of the life of the heater 14 due to overheat or to such an undesirable state that the secondary air introduction apparatus 8 is used without producing any effect of cleaning until the trouble is found.

The heater 14 is connected to chassis (not shown) of the vehicle. Frequency or mode of vibration of the vehicle chassis is different from that of the exhaust pipe 3. In order to absorb such a difference in the mode of vibration, the air introduction pipe 10a interconnecting the heater 14 and the exhaust pipe 3 is usually constituted by a metallic pipe having a flexible construction. The introduction pipe 10a, therefore, tends to be damaged in a short time due to vibratory force applied thereto as a result of the difference in the vibration mode between the vehicle chassis and the exhaust pipe 3.

Japanese Utility Model Laid-Open No. 47-21018, as well as Japanese Patent Laid-Open No. 59-60019, discloses an apparatus in which a ternary catalyst and an oxidizing catalyst are disposed in the exhaust pipe of an internal combustion engine and means are provided for supplying secondary air to the region upstream of these catalysts as shown in FIG. 14. More specifically, referring to FIG. 14, a mechanical air pump 11a is provided in the intake pipe 2 of an internal combustion engine 1. A catalyst case 6a encasing a ternary catalyst as a pre-catalyst and a catalyst case 6b encasing an oxidizing catalyst the main catalyst are connected in series in the exhaust pipe 3. A secondary air introduction pipe 10, which is connected at its one end to an air pump 11a, is branched into branch pipes which are connected to portions of the exhaust pipe 3 upstream of the catalyst cases 6a and 6b. A control valve 12a is provided at the branching portion of the air introduction pipe 10.

The operation of the air introduction apparatus for the internal combustion engine shown in FIG. 14 is as follows. The internal combustion engine 1 operates with a mixture of a fuel and air which is sucked through an air cleaner 4. The throttle valve 5 controls the rate of supply of the mixture and, hence, the output power of the internal combustion engine 1. The output power of the internal combustion engine 1 is transmitted to driving wheels of the vehicle through the transmission 7. The air/fuel ratio of the mixture is so small that the rates of emissions of carbon monoxide (CO) and the hydrocarbon (HC) are large, while the catalyst temperature has not reached a level for sufficiently activating the catalyst, immediately after the start of the engine. The air pump 11a is therefore started by the power transmitted from the engine through, for example, a driving belt, so as to supply secondary air into the portion of the exhaust pipe 3 upstream of the catalyst case 6a via the secondary air introduction passage 10. Consequently, the exhaust gas with excess air is introduced into the catalyst case 6a and the catalyst case 6b so as to make reaction with the oxygen contained in the excess air, whereby the noxious CO and HC are converted into carbon dioxide (CO2). Consequently, the exhaust gases are cleaned before relieved into the atmospheric air.

When the temperatures of the ternary catalyst and the oxidizing catalyst in the catalyst cases 6a and 6b are elevated to sufficiently activate these catalyst, the control valve 12a operates so as to introduce the secondary air only to the portion of the exhaust pipe 3 upstream of the catalyst case 6b, so that nitrogen oxides (NOx), CO and HC in the exhaust gases are removed by the ternary catalyst in the catalyst case 6a and fractions of CO and HC which could not be removed by the ternary catalyst are removed by the oxidizing catalyst in the catalyst case 6b, whereby cleaned emissions are discharged into the atmospheric air.

Thus, the secondary air introduction apparatus suppresses emission of noxious components in the exhaust gases such as carbon monoxide and hydrocarbon into the atmospheric air, particularly when the temperatures of the ternary catalyst and the oxidizing catalyst have not reached the levels necessary for activating these catalysts immediately after the start up of the internal combustion engine 1.

The described secondary air introduction apparatus suffers from the following problem. Namely, since the secondary air introduction pipe 10 is branched at the portion where the control valve 12a is disposed, the total length of the secondary air introduction passage 10 is inevitably increased, with the result that the temperature of the secondary air tends to be lowered as compared with the temperature of the exhaust gases from the internal combustion engine 1. Consequently, the temperatures of the ternary catalyst and the oxidizing catalyst are lowered to undesirably suppress the exhaust gas cleaning reaction in each catalyst.

SUMMARY OF THE INVENTION

The present invention is aimed at overcoming the above-described problems of the related arts.

Accordingly, it is a primary object of the present invention to provide an apparatus and a method of introducing secondary air for cleaning exhaust emissions from an internal combustion engine, capable of detecting occurrence of any abnormal state without delay.

Another object of the present invention is to provide an apparatus and method for introducing secondary air for cleaning exhaust emissions, improved to maintain high levels of activity of the cleaning catalysts so a to provide higher efficiency of cleaning of exhaust emissions.

Still another object of the present invention is to provide an apparatus and a method for introducing secondary air for cleaning exhaust emissions, wherein the durability of air introduction pipe against vibration is improved.

To these ends, according to one aspect of the present invention, there is provided a secondary air introduction apparatus for cleaning exhaust gases emitted from an internal combustion engine, comprising: air introduction means for introducing secondary air into an exhaust system of the engine having a catalyst for cleaning the exhaust gases; heating means for heating the secondary air to be introduced into the exhaust system; and fixing means for fixing the heating means to the exhaust system.

According to a second aspect of the present invention, there is provided a secondary air introduction apparatus for cleaning exhaust gases emitted from an internal combustion engine, comprising: air introduction means for introducing secondary air into an exhaust system of the engine having a catalyst for cleaning the exhaust gases; heating means for heating the secondary air to be introduced into the exhaust system; temperature detecting means for detecting the temperature of the secondary air heated by the heating means; and determining means for determining whether any abnormal state has occurred, based on the temperature detected by the temperature detecting means.

According to a third aspect of the present invention, there is provided a secondary air introduction apparatus for cleaning exhaust gases emitted from an internal combustion engine, comprising: air introduction means for introducing secondary air into an exhaust system of the engine having a catalyst for cleaning the exhaust gases; and heating means for heating the secondary air from the air introduction means and for shunting the heated secondary air into a plurality of directions.

According to a fourth aspect of the present invention, there is provided a method of cleaning exhaust gases emitted from an internal combustion engine, comprising: heating secondary air which is to be introduced into the exhaust system of the engine, the exhaust system having a catalyst for cleaning the exhaust gases; detecting the temperature of the heated secondary air; and determining whether or not any abnormal state has occurred, based on the detected temperature of the secondary air.

According to a fifth aspect of the present invention, there is provided a method for cleaning exhaust gases emitted from an internal combustion engine, comprising: heating secondary air which is to be introduced into the exhaust system of the engine, the exhaust system having a catalyst for cleaning the exhaust gases; shunting the heated secondary air into fractions flowing in a plurality of directions; and introducing the fractions of the secondary air into the exhaust system of the engine.

DESCRIPTION OF THE PREFERRED EMBODIMENTS

Embodiment 1

Preferred embodiments of the present invention will be described with reference to the accompanying drawings.

Figure 1:
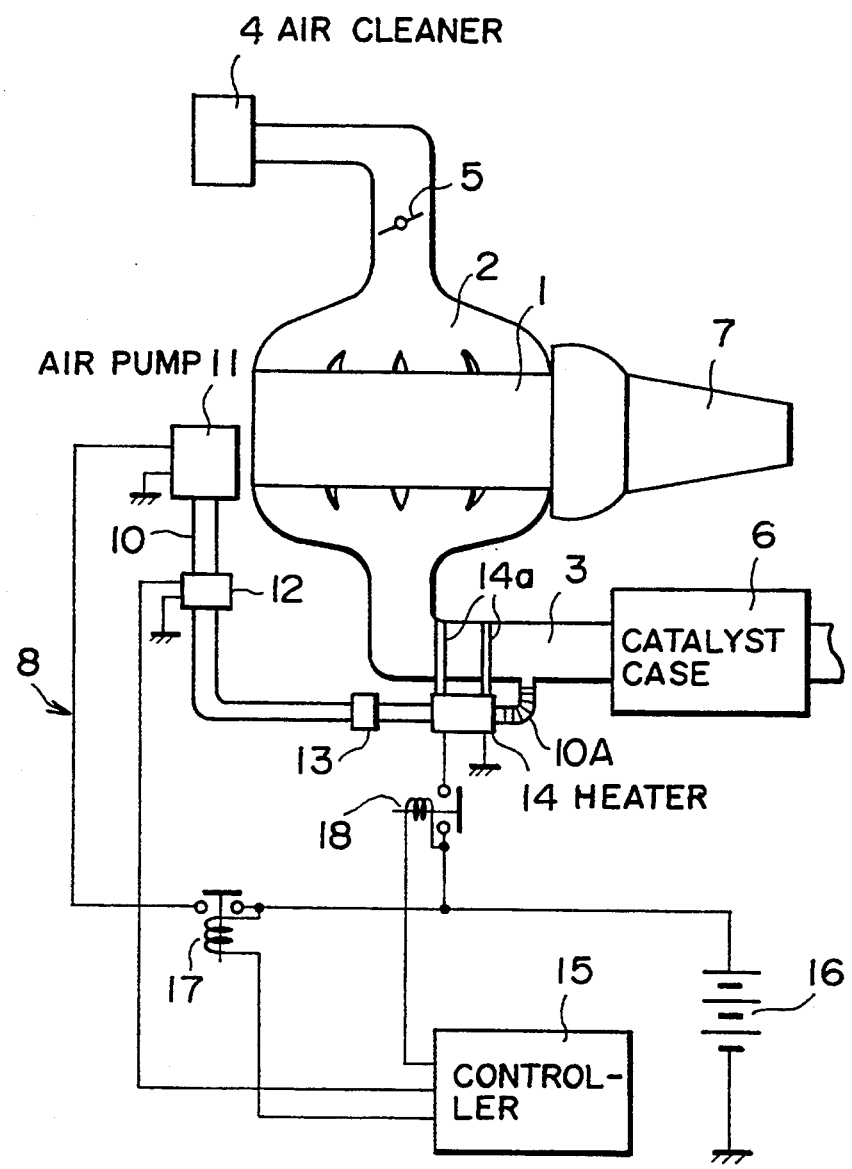
FIG. 1 is a block diagram of systems around an internal combustion engine which is provided with an air introduction apparatus as a first embodiment of the present invention.

Referring to FIG. 1, an air cleaner 4 is connected to an intake pipe 2 of an internal combustion engine 1. A throttle valve 5 is disposed in the intake pipe 2. A catalyst case 6 encasing a cleaning catalyst is provided in an exhaust pipe 3 of the internal combustion engine 1. A secondary air introduction apparatus 8 is connected to the exhaust pipe 3. The secondary air introduction apparatus includes an electrically driven air pump 11 to which is connected a heater 14 through an air introduction pipe 10. A control valve 12 and a check valve 13 are connected in series to each other in the air introduction pipe 10. The outlet of the heater 14 is connected to an exhaust pipe 3 upstream of the catalyst case 6 through an air introduction pipe 10A. The air pump 11 and the heater 14 are respectively connected to a battery 16 through relays 17 and 18 to which is connected a controller 15. The controller 15 also is connected to a control valve 12.

Figure 2:
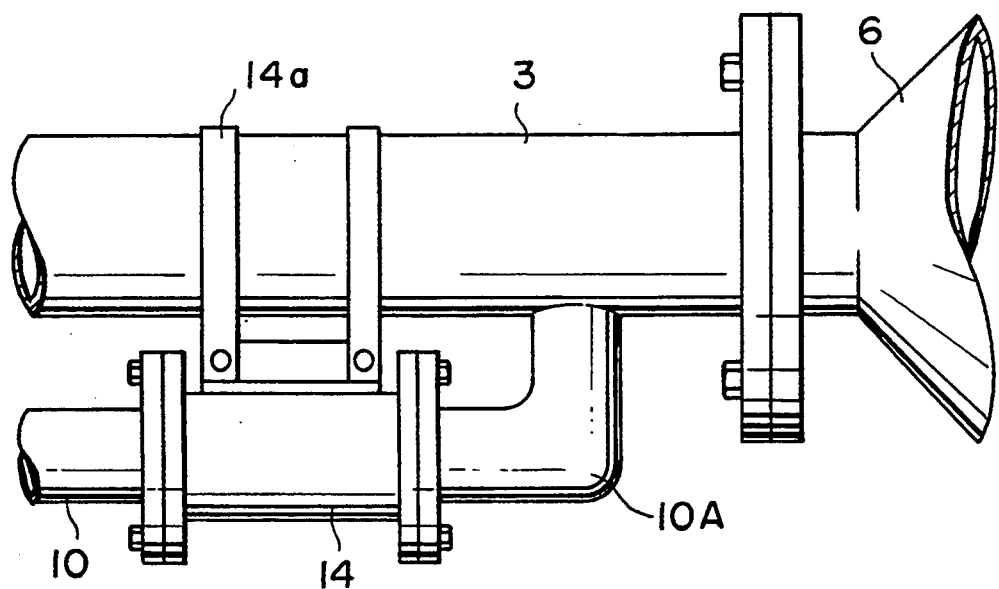
FIG. 2 is an enlarged view of a critical portion of the air introduction apparatus shown in FIG. 1.

As shown in FIG. 2, the heater 14 is fixed to an exhaust pipe 3 through a fixing member 14a.

A description will now be given of the operation of the first embodiment. Referring to FIG. 1, vibration caused by the combustion in the internal combustion engine 1 during the operation is transmitted from the internal combustion engine 1 to the exhaust pipe 3, so that the exhaust pipe 3 is continuously vibrated in a mode corresponding to the mode of vibration of the internal combustion engine.

The heater 14 is fixed to the exhaust pipe 3 through a fixing member 14a so that the heater 14 vibrates in phase with the exhaust pipe 3. The air introduction pipe 10A, which is connected between the outlet of the heater 14 and the exhaust pipe 3 and which introduces secondary air into the latter vibrates in the same mode as the heater 14 and the exhaust pipe 3.

Thus, the air introduction pipe 10A vibrates in phase with the exhaust pipe 3 and the heater 14, thus eliminating any stress which would be applied to the air introduction pipe 10A when the air introduction pipe 10A vibrates in a mode different from that of the exhaust pipe 3 and the heater 14, whereby the air introduction pipe 10A can withstand a long use.

Furthermore, the distance between the heater 14 and the exhaust pipe 3 can be reduced by virtue of the fact that the heater 14 is fixed to the exhaust pipe 3, thus reducing loss of heat due to dissipation from the air introduction pipe 10A. This ensures that the air heated by the heater 14 can be introduced into the exhaust pipe 3 with reduced temperature drop, so that the temperature of the catalyst is elevated to improve the efficiency of cleaning of the exhaust gases.

Exchange of heat is continuously conduced between the exhaust pipe 3 and the heater 14 because they are fixed to each other. A heat shield plate or other heat insulation means may be provided between the exhaust pipe 3 and the heater 14, in order to prevent undesirable heat exchange therebetween.

Embodiment 2

Figure 3:
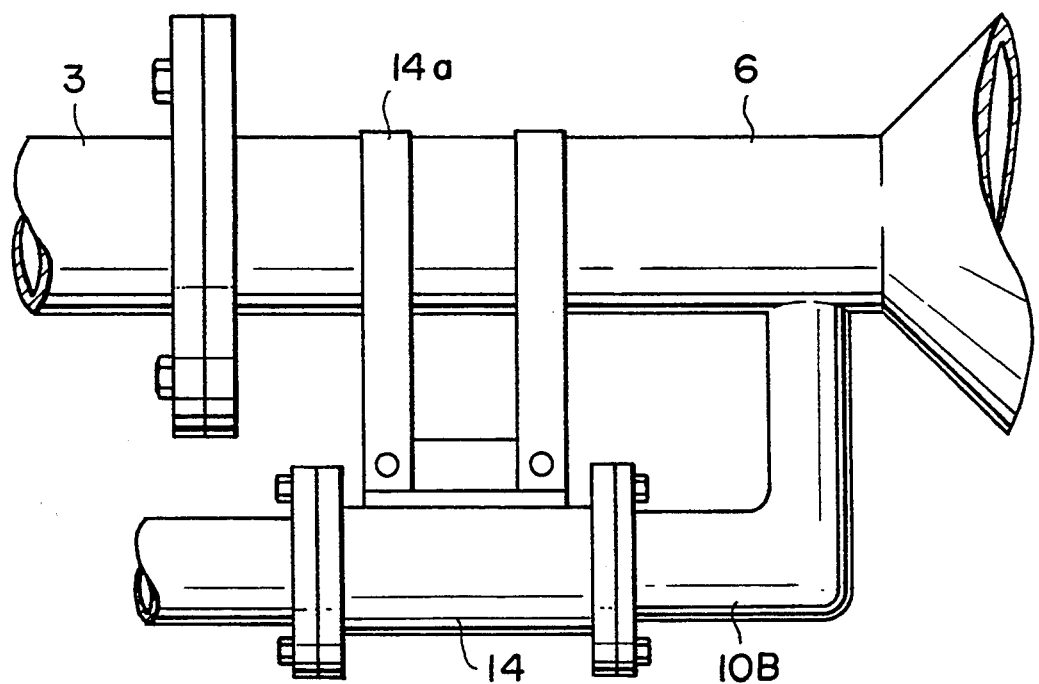
FIG. 3 is an enlarged view of a critical portion of a second embodiment of the air introduction apparatus.

In the first embodiment as described, the heater 14 is fixed to the exhaust pipe 3. A similar effect, however, is obtainable by a different arrangement in which, as shown in FIG. 3, the heater 14 is fixed to the catalyst case 6. In FIG. 3, numeral 10B denotes an air introduction pipe which interconnects the outlet of the heater 14 and the catalyst case 6.

Embodiment 3

Figure 4:
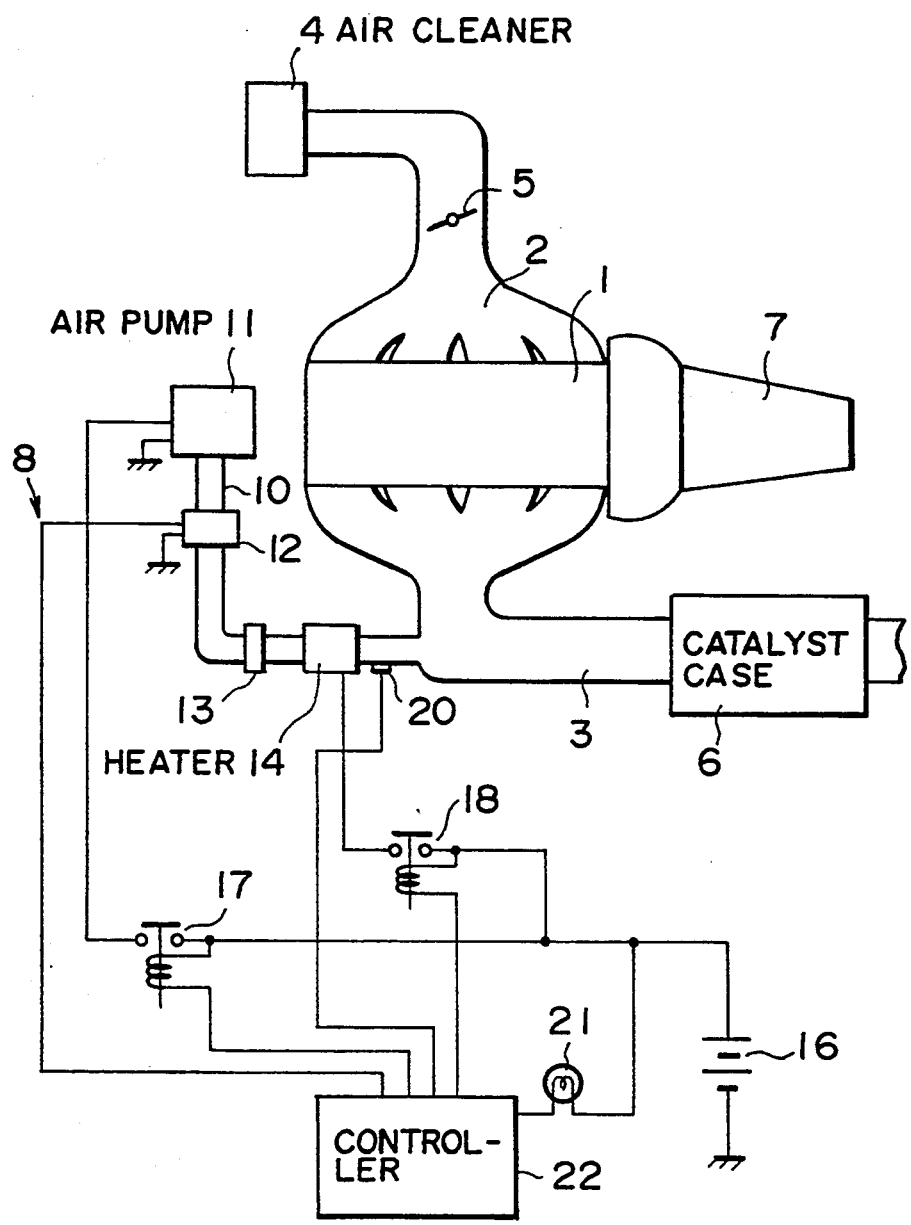
FIG. 4 is a block diagram of a third embodiment of the present invention.

FIG. 4 is a block diagram showing systems around an internal combustion engine having a secondary air introduction apparatus as a third embodiment of the present invention. In FIG. 4, the same reference numerals are used to denote the same parts or components as those shown in FIG. 1 and detailed description of such parts or components is omitted to avoid duplication of explanation.

Referring to FIG. 4, the third embodiment has a temperature detector 20 which is disposed at the end of the secondary air introduction pipe 10 adjacent to the heater 14, a warning lamp 21 which informs the operator of any abnormality occurring in the secondary air introduction apparatus 8, and a controller 22 which controls the operations of the air pump 11, control valve 12 and the heater 14 in accordance with an output signal from the temperature detector 20. The controller 22 operates to start and stop the air pump 11 and the heater 14 when the operation of the secondary air introduction apparatus is started and stopped, and controls also the opening and closing motion of the control valve 12. Furthermore, the controller 22 has a function to light up the warning lamp 21 when the output from the temperature detector 20 indicates a value below a predetermined temperature even after elapse of a predetermined time from the start of operation of the internal combustion engine 1.

Figure 5:
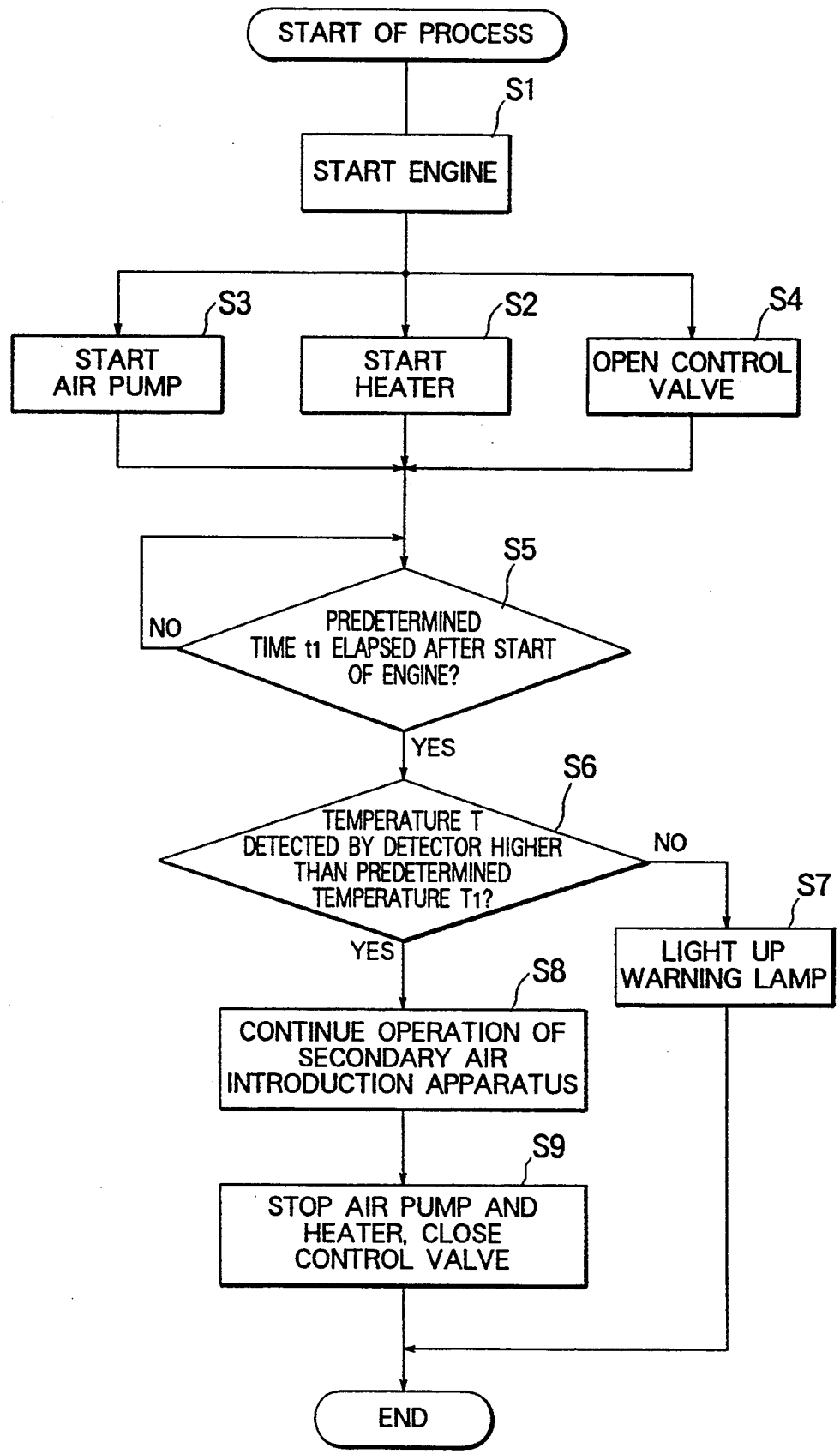
FIG. 5 is a flow chart illustrating the operation of a controller incorporated in the third embodiment.
Figure 6:
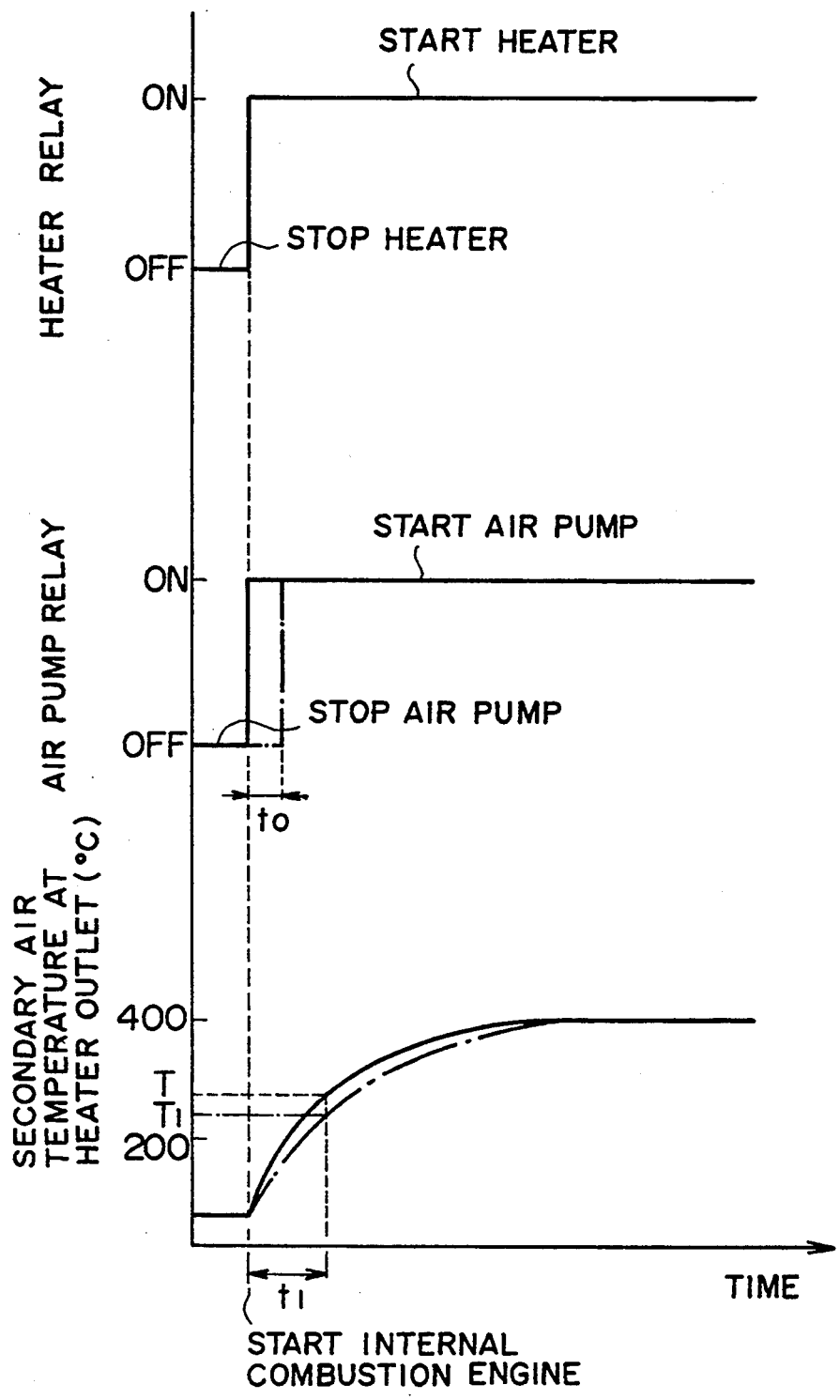
FIG. 6 is a timing chart illustrative of the operation of the third embodiment.

The operation of this secondary air introduction apparatus 8 will be described with specific reference to FIGS. 5 and 6. FIG. 5 is a flow chart illustrate of the control operation performed by the controller 22, while FIG. 6 is a graph illustrative of the states of operations of the heater 14 and the air pump 11, as well as change in the secondary air temperature at the outlet of the heater 14.

Referring to FIG. 5, the heater relay 18 is put into operation as the internal combustion engine 1 is started (Step S1). As a result, electrical power is supplied from the battery 16 to the heater 14 to activate the latter (Step S2). The air pump relay 17 starts to operate simultaneously with or with a certain time lag t0 after the activation of the heater 14. Consequently, electrical power is supplied from the battery 16 to the air pump 11 to start the latter (Step S3). The described operations of the heater 14 and the air pump 11 are shown in FIG. 6. The control valve 12 is opened to a predetermined degree of opening from the full close state, simultaneously with the start of the heater 14.

The operation of the secondary air introduction apparatus 8 is started through the process described above. The secondary air is supplied by the air pump 11 into the secondary air introduction pipe 10 via the control valve 12 and, after being heated through the heater 14, introduced into the exhaust pipe 3. Meanwhile, the temperature detector 20 detects the temperature of the secondary air at the outlet of the heater 14 and supplies the controller 22 with the output indicative of the detected temperature. The temperature of the secondary air based on the output of the temperature detector 20 varies, for example, in a manner shown in FIG. 6.

A timer (not shown) is started simultaneously with the start of the internal combustion engine 1 to measure the time after the start of the engine 1, and whether or not predetermined time t1 has passed from the time of start of the engine 1 is determined (Step S5). When the time t1 has passed, an answer YES is given so that the process proceeds to Step S6 which determines whether or not the detected temperature T based on the output of the temperature detector 20 is higher than a predetermined temperature T1 (Step S6).

The predetermined temperature T1 is a reference temperature of the secondary air which is duly attained at the outlet of the heater 14 after elapse of a predetermined time t1 from the start of the internal combustion engine 1 when the air pump 11 and the heater 14 are operated simultaneously with the start of the internal combustion engine 1 with the control valve 12 opened to the predetermined degree of opening. The predetermined temperature T1 is beforehand stored in the controller 22. Step S6, upon confirming the condition of $T<T1$, gives an answer NO, thus determining that abnormality has occurred in the apparatus and lighting up the warning lamp 21 (Step S7).

The operator is informed by the warning of the occurrence of the abnormal state and turns to inspection of the apparatus. Upon finding the cause of the abnormality, the operator takes a suitable countermeasure to remove the cause of the trouble. It is therefore possible to eliminate failure of the supply of the secondary air to the exhaust pipe 3 from the secondary air introduction apparatus 8. If the heater 14 alone has been operated wrongly, the heater is stopped to avoid overheating.

Various abnormal states are conceivable, such as failure of supply of the secondary air to the heater 14 due to a trouble in the air pump 11 or sticking of the control valve 12 in full close position. In such a case, the failure is detected because the output level of the temperature detector 20 is not raised, as the heated air does not flow towards the temperature detector 20.

It is determined that there is no abnormality in the apparatus when condition of $T \geq T1$ (see FIG. 6) is confirmed in Step S6. An answer YES is therefore given so that the operation of the secondary air introduction apparatus 8 is continued (Step S8). Thus, secondary air heated to a predetermined temperature is supplied by the secondary air introduction apparatus 8 into the exhaust pipe 3, thus elevating the temperature of the exhaust gases in the exhaust pipe 3, as well as the temperature of oxygen contained in the exhaust pipe 3. This enables the catalyst in the catalyst case 6 to remove HC and CO in the exhaust gas more efficiently. The operation of the secondary air introduction apparatus 8 is stopped when a predetermined temperature is reached in the cleaning catalyst, as a result of the operation of the internal combustion engine 1 which also causes a rise in the temperatures of cooling water and lubricating oil in the internal combustion engine 1. Thus, the heater 14 and the air pump 11 stop to operate and the control valve 12 is operated to the full-close position (Step S9).

Thus, occurrence of any abnormality in the secondary air introduction apparatus 8 can be detected by sensing the temperature of the secondary air at the outlet of the heater 14 in the described secondary air introduction apparatus 8. It is therefore possible to eliminate any undesirable state such as shortening of life of the heater 14 due to overheating, continuation of operation of the secondary air introduction apparatus 8 without producing any cleaning effect before the detection of occurrence of abnormal state. The described secondary air introduction apparatus 8 makes it possible to enhance the activity of the catalyst in the catalyst case 6 when the catalyst temperature is still low immediately after start up of the engine from the cold state, by virtue of the heating of the secondary air to be supplied.

The described embodiment may be modified such that the controller, upon detection of abnormal state, not only activates the warning lamp 21 but also stops both the air pump 11 and the heater 14 and completely shuts off the control valve 12, thereby terminating the operation of the secondary air introduction apparatus with minimum delay. The arrangement also may be devoid of the warning lamp 21. In such a case, the controller operates to stop the operation of the secondary air introduction apparatus without producing any warning.

It is also possible to arrange such that, when any abnormal state is found, the control valve 12 is operated at least once between full close position and full open position (or an opening which provides a predetermined flow rate of air), followed by rechecking of the secondary air temperature at the outlet of the heater 14. The warning lamp 20 is then lit up as required.

There is a risk that an abnormally high temperature of the secondary air is established at the outlet of the heater 14, due to slight leak of the secondary air to the heater 14 past the air pump 11 and the control vale 12. The arrangement therefore may be such that the controller 22 operates to light up the warning lamp 21 when the temperature detector 20 has detected any abnormally high temperature.

Embodiment 4

Figure 7:
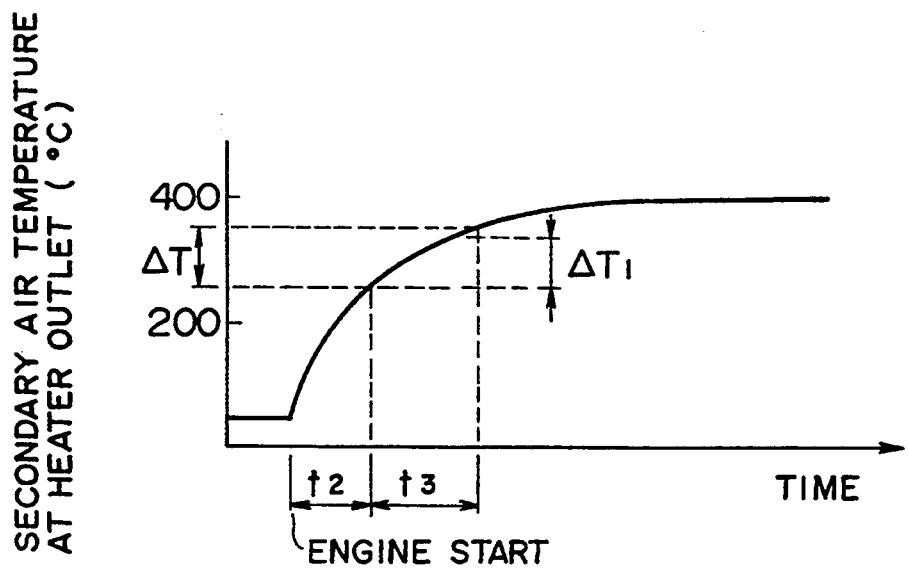
FIGS. 7 and 8 are timing charts illustrative of the operations of the fourth and fifth embodiments, respectively.

FIG. 7 illustrates the manner in which abnormal state of the apparatus is detected by the controller in a fourth embodiment of the secondary air introduction apparatus of the present invention.

The secondary air introduction apparatus of the fourth embodiment is so arranged that occurrence of any abnormality is detected on the basis of the increment or amount of rise of the secondary air temperature detected by the temperature detector 20, i.e., whether the amount of temperature rise has reached a predetermined criterion. More specifically, the controller 22 computes the amount of temperature rise $\Delta T$ between a moment which is a time t2 after the start of the engine 1 and a moment which is a predetermined time t3 after the first-mentioned moment, as detected by the temperature detector 20. The controller 22 then determines whether the detected amount of temperature rise $\Delta T$ has reached a predetermined amount of temperature rise $\Delta T1$ which is a reference value stored beforehand in the controller 22. The controller 22 operates to light up the warning lamp 21 when the amount of temperature rise $\Delta T$ has not reached yet the predetermined temperature rise amount $\Delta T1$. The above-mentioned time t2 may be set to zero: namely, the secondary air temperature detected when the internal combustion engine 1 is started, i.e., ambient air temperature, may be used as the basis for the computation of the above-mentioned temperature rise amount $\Delta T$.

This secondary air introduction apparatus offers an advantage in that occurrence of abnormal state of the apparatus can be detected without fail regardless of the temperature of the ambient air.

Embodiment 5

Figure 8:
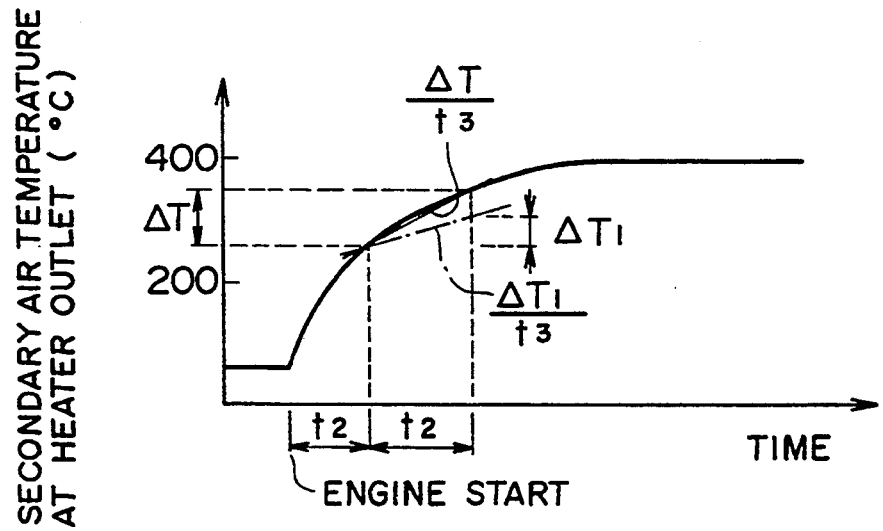

FIG. 8 illustrates the manner in which the controller detects occurrence of abnormal state in a fifth embodiment of the secondary air introduction apparatus of the present invention.

The secondary air introduction apparatus of the fifth embodiment is characterized in that it detects occurrence of any abnormal state on the basis of the rate of change in the secondary air temperature detected by the temperature detector 20, i.e., depending on whether or not the rate of change in the secondary air temperature has reached a predetermined value. More specifically, the controller computes the rate $\Delta T/t3$ of the change $\Delta T$ in the secondary air temperature between a moment which is a predetermined time t2 after the start of the internal combustion engine 1 and a moment which is a predetermined time t3 after the first-mentioned moment. The controller 22 then determines whether the computed rate $\Delta T/t3$ of change $\Delta T$ in the secondary air temperature has reached a predetermined rate $\Delta T1/t3$ of temperature change $\Delta T1$, the predetermined rate $\Delta T1/t3$ being a reference value stored beforehand in the controller 22. The controller 22 operates to light up the warning lamp 21 when the rate $\Delta T/t3$ has not reached yet the predetermined rate $\Delta T1/t3$. The above-mentioned time t2 may be set to zero: namely, the secondary air temperature detected when the internal combustion engine 1 is started, i.e., ambient air temperature, may be used as the basis for the computation of the above-mentioned temperature change rate $\Delta T/t3$.

The secondary air introduction apparatus 8 can detect occurrence of any abnormality based on the rate of change, i.e., the amount of change per unit time, of the secondary air temperature. Thus, the detection of abnormality is possible from the beginning of operation of the secondary air introduction apparatus 8.

Embodiment 6

Figure 9:
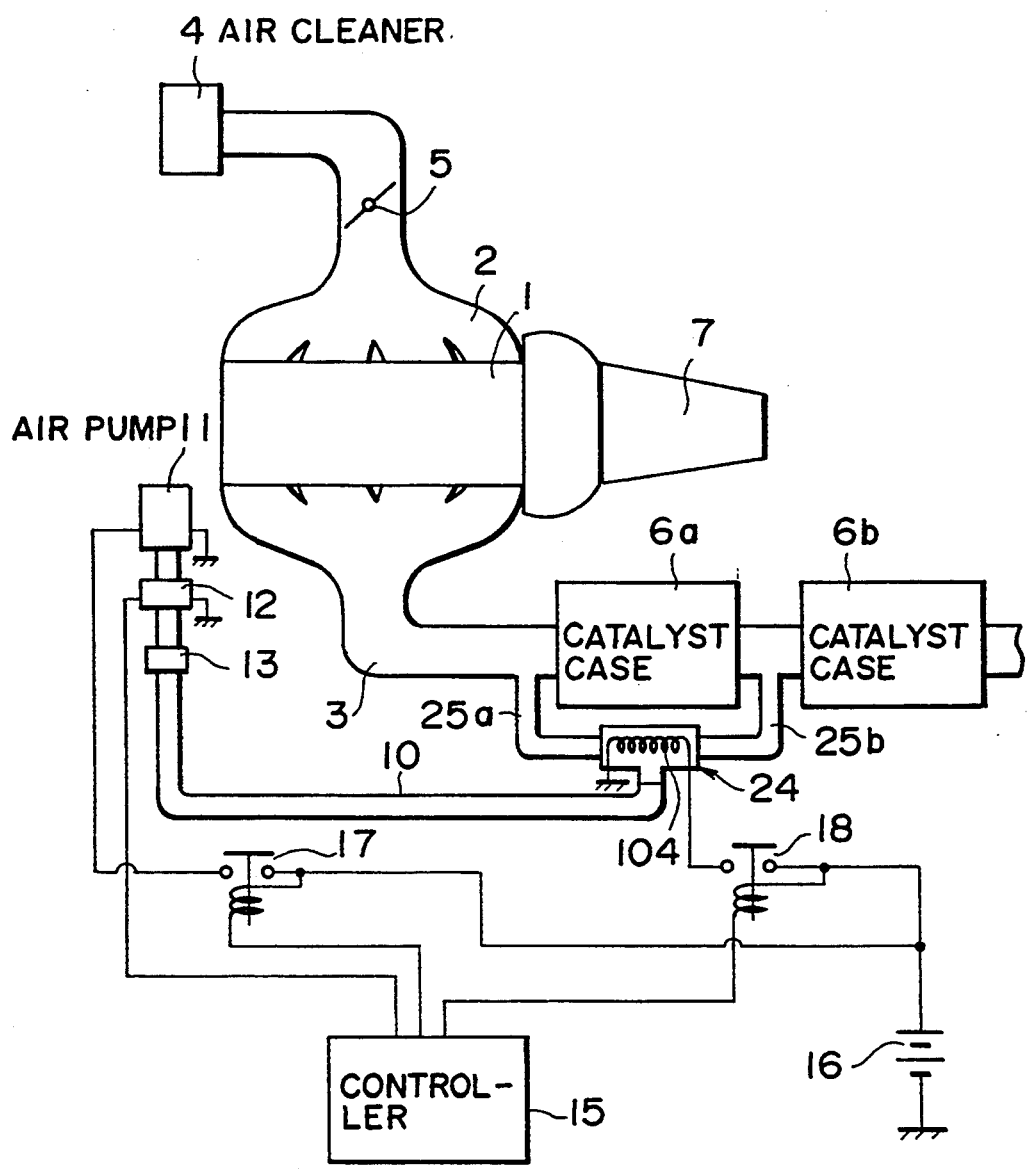
FIG. 9 is a block diagram of a sixth embodiment of the present invention.

FIG. 9 shows a sixth embodiment of the air introduction apparatus. In the sixth embodiment, a catalyst case 6a encasing a ternary catalyst and a catalyst case encasing an oxidizing catalyst are arrange din series in the exhaust pipe 3 of an internal combustion engine 1. A heater 24 is connected to the end of the air introduction pipe 10. The heater 24 has two outlets connected to introduction pipes 25a and 25b which are respectively connected to portions of the exhaust pipe 3 upstream of the catalyst case 6a and upstream of the catalyst case 6b.

Figure 10:
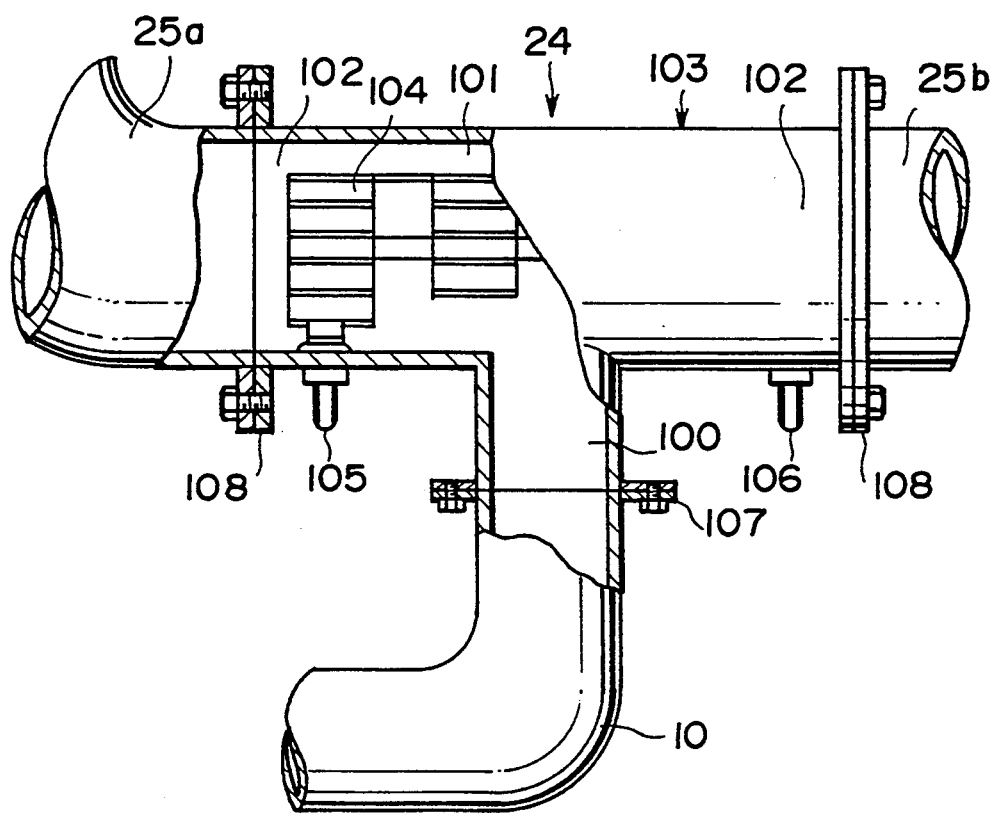
FIG. 10 is a partly-sectioned elevational view showing a critical portion of the sixth embodiment.

A detailed description will now be given of the construction of the heater 24, with specific reference to FIG. 10. The heater 24 includes a case body 103 having an air introduction port 100, a branching portion 101 and air discharge ports 102, 102 which constitute the outlets of the branching portion 101, and a heating element 104 which is disposed at the branching portion 101 within the case body 103. The heating element 104 is adapted to be supplied with external electrical power through power connection terminals 105, 106. An air introduction pipe 10, which is connected at its one end to the air pump 11, is connected at its other end to the air introduction port 100 through a connector flange 107, whereby the heater 24 is connected to the air introduction pipe 10. Introduction pipes 25a, 25b, which are connected at their one ends to the portions of the exhaust pipe 3 upstream of the catalyst case 6a and upstream of he catalyst case 6b, are connected at their other ends to the respective air outlet ports 102, 102 through connector flanges 108, 108. The air outlet ports 102, 102 have an equal cross-sectional area.

A description will now be given of the operation of the sixth embodiment. As the internal combustion engine 1 starts, the controller 15 detects the temperature of the oxidizing catalyst, based on, for example, the output from a temperature sensor (not shown) attached to the catalyst case 6b. The controller 15, upon detection of the oxidizing catalyst temperature being not higher than a set temperature, operates to turn on the air pump relay 17 and the heater relay 18, thereby activating the air pump 11 and the heating element 10 of the heater 24. The secondary air forced to flow by the Air pump 11 is introduced into the air introduction port 100 of the heater 24 through the air introduction pipe 10. The flow of the secondary air introduced into the air introduction port 100 shunts into two directions at the branching portion 101 so as to be heated by the heating elements 104. Two fractions of the secondary air thus heated are introduced to the aforesaid portions of the exhaust pipe 3 through the introduction pipes 25a, 25b. The check valve 13 prevents any reversing of the secondary air in the air introduction pipe 10. In this state, the exhaust gases contact excess air so as to make oxidizing reaction with the oxygen contained in the air, whereby noxious components such as CO and HC are converted into CO2. Thus, the exhaust gases, which are rich in noxious components such as CO and HC particularly shortly after the start of the internal combustion engine, are cleaned before emitted to the atmospheric air.

The temperatures of the ternary catalyst and the oxidizing catalyst are raised to reach the reaction temperatures at which both catalysts exhibit sufficiently large activity. Such rise of the catalyst temperatures is sensed by the temperature sensor the output of which is delivered to the controller. Upon receipt of the output from the temperature sensor, the controller 15 operates to reduce the opening of the control valve 12 (or completely shuts off the control valve 12), thereby decreasing (or reducing to zero) the rate of introduction of the secondary air into the exhaust pipe 3. In this state, the catalyst in the case 6a acts to remove NOx, CO and HC of the exhaust gases simultaneously, further, any residual CO and HC which could not be removed by the catalyst in the catalyst case 6a are removed by the catalyst in the catalyst case 6b, whereby the exhaust gases are cleaned before emitted to the atmosphere.

According to the sixth embodiment as described, since the secondary air is heated before it enters the exhaust pipe 3 so that lowering of the temperature of the exhaust gases from the internal combustion engine 1 is suppressed and the rise of the catalyst temperatures is promoted. Consequently, the catalysts are quickly heated and activated to suppress any reduction in the cleaning reactions of the catalysts, thus improving the efficiency of cleaning of the exhaust gases.

Furthermore, since the heater 24 is attached to the rear end of the air introduction pipe 10, so that the heater 24 can be disposed in the vicinity of the portions of the exhaust pipe 3 into which the secondary air is introduced, despite the branching of the secondary air introduction pipe 10. This facilitates the assembly of the secondary air introduction apparatus and makes it possible to reduce the lengths of the introduction pipes 25a, 25b which interconnect the heater 24 and the exhaust pipe 3. As a consequence, temperature drop of the secondary air to be introduced into the exhaust pipe 3 is suppressed to offer a further improvement in the cleaning efficiency.

The described sixth embodiment is applied to an internal combustion engine 1 of the type which has only one exhaust pipe 3 connected thereto. This embodiment, however, may be arranged to be adaptable to an internal combustion engine 1 having two exhaust pipes. In such a case, the series connection of the catalyst cases 6a and 6b is provided in each of the exhaust pipes and the heater 24 is modified to have four outlets which are connected to the portions upstream of the catalyst cases 6a and upstream of the catalyst cases 6b of the respective exhaust pipes.

Embodiment 7

Figure 11:
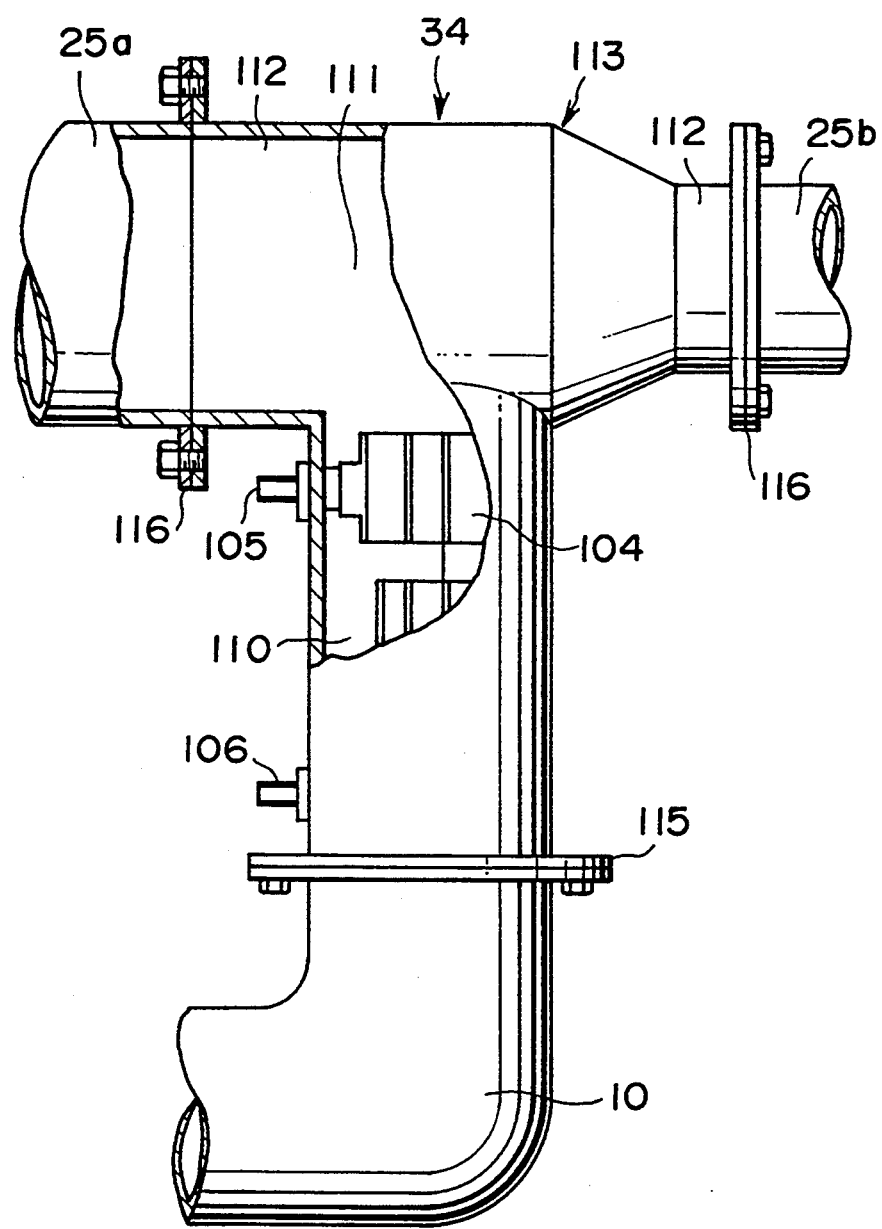
FIG. 11 is a partly-sectioned elevational view showing a critical portion of the seventh embodiment.
Figure 12:
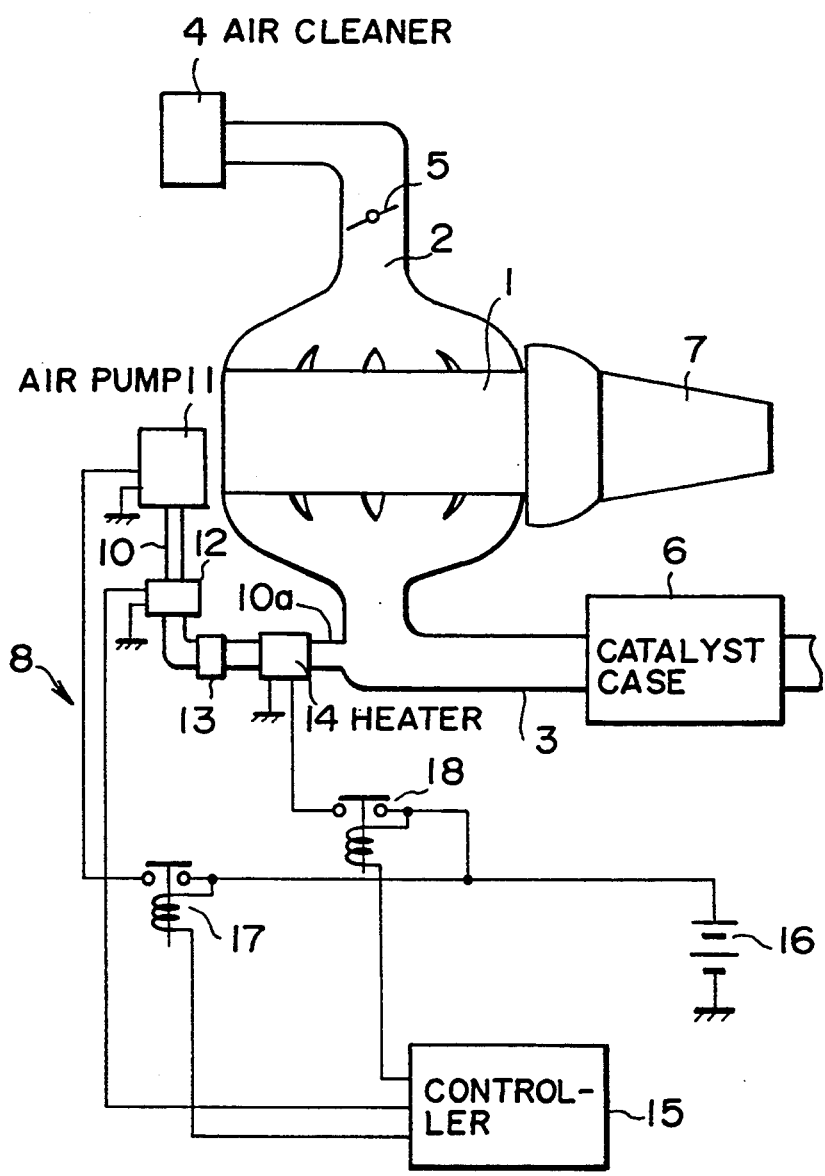
FIG. 12 is a block diagram of a known air introduction apparatus.
Figure 13:
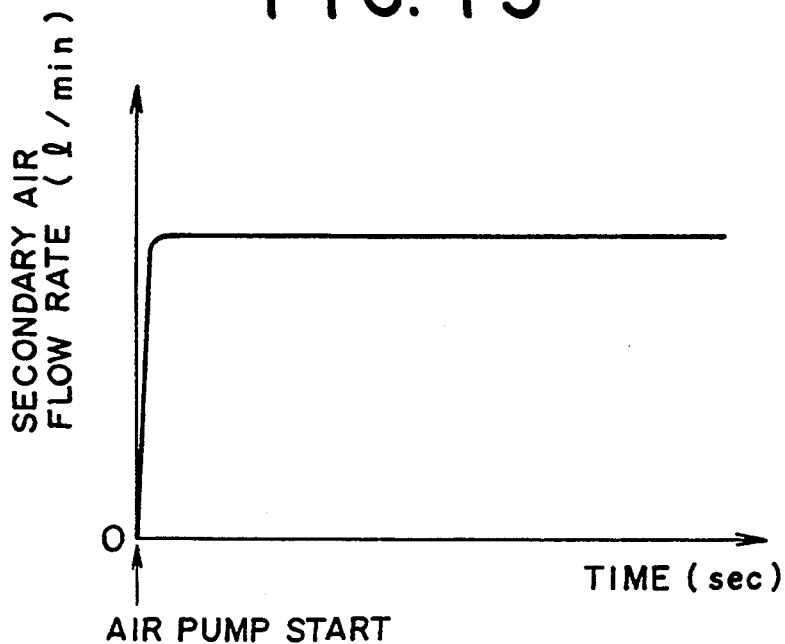
FIG. 13 is a graph showing the manner in which the flow rate of secondary air varies in the apparatus shown in FIG. 12.
Figure 14:
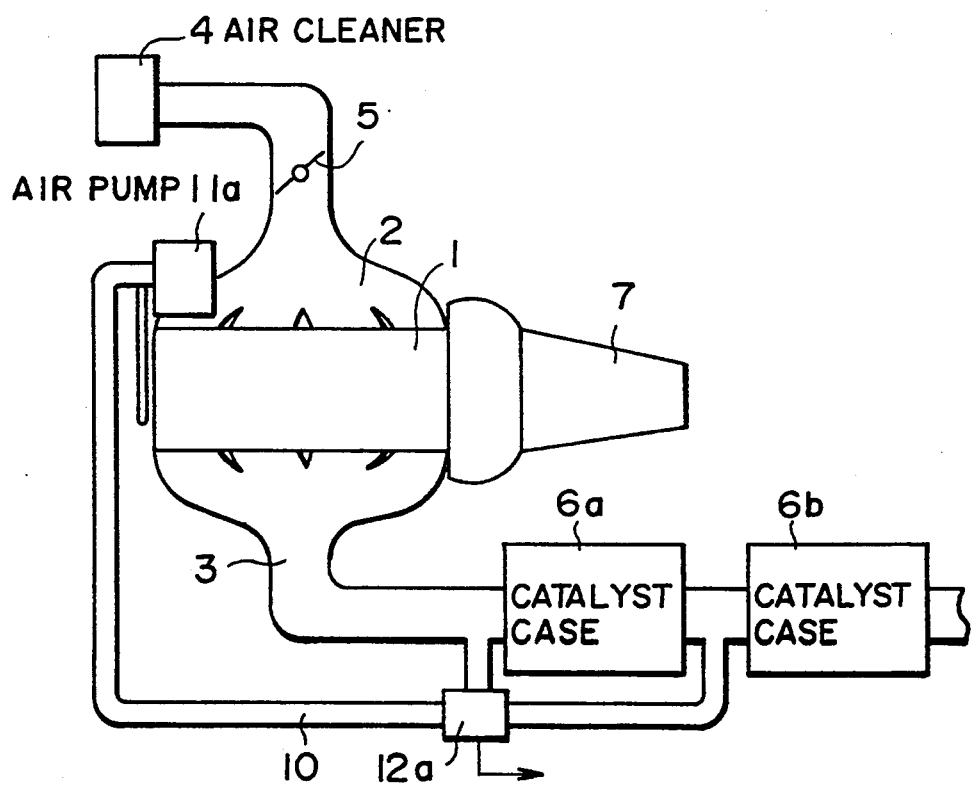
FIG. 14 is a block diagram of another known apparatus.

A description will now be given of a seventh embodiment of the air introduction apparatus of the invention. The seventh embodiment is similar to the sixth embodiment except that a heater 34 as shown in FIG. 11 is used in place of the heater 24 of the sixth embodiment. Referring to FIG. 11, the heater 34 includes a case body 113 having an air introduction port 110 for introducing the secondary air into the heater 34, a branching portion 111 at which the secondary air shunts into two directions and air outlet ports 112, 112 for discharging the heated secondary air. The outlet ports 112, 112 have different cross-sectional areas. The heater 34 also has a heating element 104 disposed within the air introduction port 110 of the case body 113. The air introduction port 110 is connected to the air introduction pipe 10 through a connector flange 115, while the air outlets 112, 112 are connected to introduction pipes 25a, 25b through connector flanges 116, 116, respectively.

In the seventh embodiment, secondary air is forced by the air pump 11 into the air introduction port 110 through the air introduction pipe 10. The air is then heated through the heater element 104 and then shunts at the shunting portion 111 into two directions. Two fractions of the secondary air thus obtained are then discharged through two outlet ports 112, 112 at flow rates which are determined by the cross-sectional areas of the two outlets 112, 112. Other portions of the operation are materially the same as those of the sixth embodiment described before.

Thus, the seventh embodiment features that the secondary air introduced into the heater shunts into two fractions after being heated and the fraction are introduced into the portions of the exhaust pipe 3 upstream of the catalyst case 6a and upstream of the catalyst case 6b. Thus, the seventh embodiment offers the same advantage as that produced by the sixth embodiment.

Furthermore, since two outlets 112, 112 have different cross-sectional areas, the fractions of the heated second air are introduced into the catalyst cases 6a and 6b at rates which are optimum for the capacities of these catalyst cases, thus achieving a further improvement in the cleaning efficiency.

Although a ternary catalyst is used as the pre-catalyst in each of the sixth and seventh embodiment, this is not exclusive and the advantages produced by these embodiments can equally be enjoyed also when a different type of catalyst, e.g., a reducing catalyst, is used as the pre-catalyst.

In the sixth and seventh embodiments as described are so arranged that the degree of opening of the control valve 12 is controlled by the controller 15 which detects the state of activation of the oxidizing catalyst based on the output of the temperature sensor connected to the catalyst case 6b. In general, however, the time required for the catalysts sufficiently activated to perform steady cleaning operation is almost constant and ranges from several tens of seconds and several minutes. It is therefore possible to arrange such that the controller 15 controls the degree of opening of the control valve 12 in accordance with the time after start of the internal combustion engine 1. Such a control of the control valve based on the time elapsed after the start of the internal combustion engine 1 produces almost the same effect as those presented by the sixth and seventh embodiments.

What is claimed is:

1. A secondary air introduction apparatus for cleaning exhaust gases emitted from an internal combustion engine, comprising:
   air introduction means for introducing secondary air into an exhaust system of the engine having a catalyst for cleaning the exhaust gases;
   heating means for heating the secondary air to be introduced into said exhaust system;

temperature detecting means for detecting the temperature of the secondary air heated by said heating means; and determining means for determining whether any abnormal state has occurred, based on the temperature detected by said temperature detecting means.

2. An apparatus according to claim 1, further comprising warning means operable to produce warning when said determining means has determined that abnormal state has occurred.

3. An apparatus according to claim 1, wherein said determining means determines that an abnormal state has occurred when the temperature detected by said temperature detecting means a predetermined time after the start of said internal combustion engine is not higher than a predetermined temperature.

4. An apparatus according to claim 1, wherein said determining means determines that an abnormal state has occurred when the amount of temperature rise detected by said temperature detecting means within a predetermined time after the start of said internal combustion engine is not greater than a predetermined value.

5. An apparatus according to claim 1, wherein said determining means determines that an abnormal state has occurred when the rate of temperature rise detected by said temperature detecting means within a predetermined time after the start of said internal combustion engine is not greater than a predetermined value.

6. An apparatus according to claim 1, wherein said air introduction means includes:

an air pump;

a first introduction pipe which introduces the secondary air supplied by said air pump into said heating means;

a second introduction pipe which introduces the secondary air heated through said heating means to the exhaust system of said internal combustion engine;

a control valve provided in said first introduction pipe and controlling the flow rate of the secondary air flowing therethrough; and introduction control means which controls the operations of said heating means, said air pump and said control valve.

7. An apparatus according to claim 6, wherein said determining means, upon determining that an abnormal state has occurred, stops the introduction of the secondary air by the air introduction means.

* * * * *